United States Patent [19]

Lambert et al.

[11] Patent Number: 4,951,046
[45] Date of Patent: Aug. 21, 1990

[54] RUNWAY LIGHTING SYSTEM

[75] Inventors: Robert E. Lambert, Enfield, Conn.; Simcha Ohrenstein, Tel-Aviv, Israel

[73] Assignee: Cooper Industries, Inc., Houston, Tex.

[21] Appl. No.: 272,598

[22] Filed: Nov. 17, 1988

[51] Int. Cl.$^5$ .............................. G08B 5/00
[52] U.S. Cl. ........................ 340/953; 244/114 R; 340/947
[58] Field of Search ............... 340/947, 949, 950, 952, 340/953, 948, 951; 73/178 T; 244/114 R; 362/62; 342/33

[56] References Cited

U.S. PATENT DOCUMENTS

| | | | |
|---|---|---|---|
| 2,337,614 | 12/1943 | McDowell | 340/950 |
| 2,602,850 | 7/1952 | Cline | 340/949 |
| 3,531,765 | 9/1970 | Christianson et al. | 340/953 |
| 4,093,937 | 6/1978 | Habinger | 340/949 |
| 4,201,973 | 5/1980 | Jackson et al. | 340/949 |
| 4,313,063 | 1/1982 | McHerron | 340/948 |
| 4,554,544 | 11/1988 | Task | 340/947 |
| 4,590,471 | 5/1986 | Pieroway et al. | 340/947 |

Primary Examiner—Joseph A. Orsino
Assistant Examiner—Brent A. Swarthout
Attorney, Agent, or Firm—Michael F. Heim; David S. Wise

[57] ABSTRACT

An improved runway lighting system comprises a first set of runway lights providing illumination in one direction along the runway, a second set of runway lights providing illumination in the opposite direction along the runway and a switching unit for switching on either the first set of lights or the second set of lights, depending on the direction of approach of incoming aircraft. A control unit provides current pulses along existing runway circuitry to operate the switching unit. Circuitry in the switching unit determines which set of lights to illuminate based upon the amplitude and duration of the current pulse. A selector switch may also be provided in the control tower to remotely operate the control unit.

20 Claims, 5 Drawing Sheets

RUNWAY LIGHTING SYSTEM

BACKGROUND OF THE INVENTION

The present invention relates generally to an airport runway lighting system and more particularly to a bidirectional lighting system including means for switching illumination between the two directions. Still more particularly, the present invention comprises a selectable, bidirectional runway lighting system arranged for implementation in existing runway or new lighting circuitry.

Existing airport runways typically include a series of runway light fixtures secured along the centerline of an aircraft runway. In general, the fixtures direct light from a single lamp simultaneously along both approaches to the runway. The fixtures secured along a length of runway each are coupled by means of a series current transformer to a single alternating current transmission line extending from a constant current regulator through an electrical vault beneath the runway. The constant current regulator typically generates a current at one of five preselected amplitudes, including 2.8, 3.4, 4.1, 5.2, and 6.6 RMS amperes. A five-position manual intensity control switch located in the airport control tower connects via a multiconductor cable to the constant current regulator located in the electrical vault and controls the amplitude of current generated by the current regulator. The control switch thereby enables airport personnel in the control tower to select individually the intensity of runway light illumination for each runway.

It should be apparent to those having skill in the art that a runway lighting system that utilizes two lamps in each fixture, the illumination of each lamp being directed along a single runway approach, has certain advantages over a system using single-lamp fixtures. First, a two-lamp fixture with but one lamp illuminated at any one time will consume substantially less power to achieve a given illumination level than will a single-lamp fixture projecting the same illumination level along both approaches. Second, as a consequence of the lower power consumption in a two-lamp fixture and the nonuse of one lamp in each two-lamp fixture at any one time, the mean time between failure of a lamp in a two-lamp fixture will exceed that of a single-lamp fixture. Finally, use of a lighting system with two-lamp fixtures, which, unlike single-lamp systems, provides illumination along only one runway approach at any one time, confirms to aircraft pilots that they are approaching the runway from the proper direction.

Despite the inherent advantages of a runway lighting system using two-lamp fixtures, as one skilled in the art will appreciate, a switchable two-lamp system typically is prohibitively expensive to implement. Using technology well known in the prior art, such a system would require two separate current transmission lines along each runway instead of the single transmission line currently in use. In addition, each two-lamp fixture would require the use of two current transformers rather than one. Finally, an additional apparatus would be necessary in a two-lamp system to couple selectively one of the two current transmission lines to the single current regulator. Typically, the expense necessary to implement the foregoing lighting system using two-lamp fixtures exceeds any savings to be expected from such a system. Thus, prior art technology in the art of airport runway lighting systems does not provide a practical means for implementing a lighting system using two-lamp fixtures.

SUMMARY OF THE INVENTION

Accordingly, a runway lighting system constructed in accordance with the principles of the present invention comprises a plurality of lighting fixtures each having at least two lamps, means for regulating electrical energy, means for communicating electrical energy from the regulating means to each lighting fixture, means for selecting between at least two approaches to a runway, means responsive to the selecting means for encoding the selected approach in the electrical energy communicated from the regulating means to each lighting fixture, and means at each lighting fixture for decoding the selected approach and illuminating a corresponding lamp. Each lighting fixture in the inventive system preferably comprises a two-lamp fixture arranged to illuminate one lamp at a time for a single direction of approach along an airport runway. The selecting means for each system forms a part of a control panel in the airport control tower, such panel also typically including an intensity selector switch for the corresponding lighting system. The encoding means responds to a change in the selecting means by causing the regulating means to encode the selected direction of approach to the runway in the electrical signal communicated to each fixture. The decoding means at each fixture then interprets the encoded message and illuminates the appropriate lamp for the selected approach direction.

The selecting means may comprise, for example, a double-pole switch on the control panel located in the control tower. The regulating means may comprise, for example, a constant current regulator already in use in typical runway lighting systems. The encoding means may comprise, for example, an electronic control apparatus that interfaces with a preexisting electrical cable between the constant current regulator and the intensity selector switch in the control tower. In response to a change in position of the selecting means, the control apparatus of the encoding means causes the constant current regulator of the regulating means to generate a current pulse of predetermined amplitude and duration. The position of the selecting means preferably is encoded in the amplitude of the current pulse. Electronic apparatus forming a part of the decoding means identifies the encoded current pulse, decodes its amplitude, and illuminates the corresponding lamp.

As one skilled in the art will appreciate, a runway lighting system constructed in accordance with the principles of the present invention enables one to enjoy the advantage of a lighting system employing two-lamp, directionally selectable lighting fixtures without incurring the substantial expense attributable to the use of redundant current transmission cables, redundant current transformers at each fixture, and apparatus for switching between the two cables. The lighting system of the current invention employs relatively inexpensive electronic circuitry to accomplish the desired result at substantially lesser expense. These and various other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein.

DETAILED DESCRIPTION OF THE PREFERRED EMBODIMENT

Typical prior art runway lighting systems employ a series of single-lamp fixtures providing simultaneous illumination along both approaches to a runway. Those skilled in the art will recognize that a lighting system employing two lamps in each fixture, with no more than one lamp for each runway approach being illuminated at any one time, has certain inherent advantages; however, the skilled artisan will recognize also that the use of known techniques to construct and operate a lighting system using a series of two-lamp, directionally selectable lighting fixtures is prohibitively expensive. Accordingly, the present invention provides an apparatus and method using existing runway lighting hardware and some additional, relatively inexpensive electronic control apparatus to construct and operate a two-lamp runway lighting system.

Figure 1:
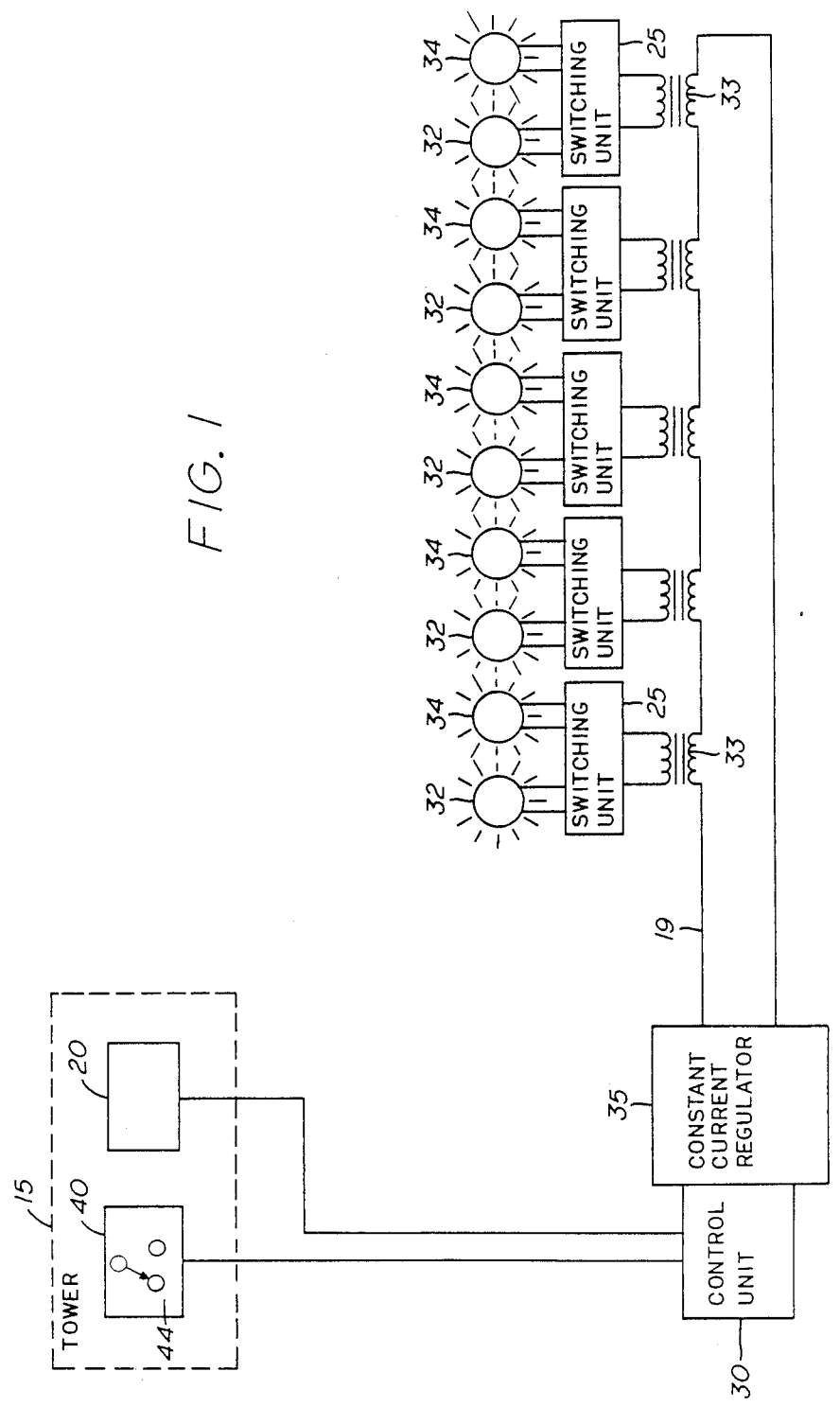
FIG. 1 is a block diagram of the general layout of an airport runway lighting system constructed according to the principles of the present invention.

More particularly, as shown in FIG. 1, a lighting system constructed in accordance with the principles of the present invention generally comprises a plurality of switching units 25, each being electrically connected to a pair of directionally selectable lamps 32, 34, a conventional constant current regulator 35, a control unit 30 electrically coupled to the constant current regulator 35 for encoding information for transmission along a runway transmission line 19 to each switching unit 25, a position selector switch 40 installed in an airport control tower 15 for selecting the desired direction of illumination of the runway, and an intensity selector switch 20 installed in the control tower and electrically connected to the control unit 30.

Typically, the intensity selector switch 20 forms part of prior art airfield lighting control panels in the airport control tower 15. The intensity selector switch 20 generally connects electrically to the constant current regulator 35, and the current regulator 35 generates and regulates an output signal having an amplitude dependent upon the signal received from the intensity selector switch 20.

Referring still to FIG. 1, the position selector switch 40 preferably is installed in the airport control tower 15 adjacent the intensity selector switch 20. The selector switch 40 generates a control signal that is transmitted to the control unit 30 across electrical conductors between the control panel in the control tower and the constant current regulator 35 in an electrical vault. The control unit 30 receives the control signal from the position selector switch 40 and a control signal from the intensity selector switch 20 and transmits an appropriate signal to the constant current regulator 35.

In operation, when the control unit 30 detects a change in the control signal from the position selector switch 40, the control unit 30 turns off the current regulator 35 for approximately 5.6 seconds. At the expiration of 5.6 seconds, the control unit 30 causes the current regulator 35 to transmit a current pulse of approximately 5.6 seconds duration. The position of the position selector switch 40 is encoded by the control unit 30 in the amplitude of the current pulse transmitted by the current regulator 35 along the transmission line 19 to each switching unit 25.

Each switching unit 25 is coupled electrically to the transmission line 19 through a current transformer 33. In operation, the switching unit 25 resets when the current regulator 35 is turned off by the control unit 30. Each switching unit 25 then detects the succeeding 5.6 second current pulse, decodes the amplitude of the pulse, and illuminates the appropriate lamp 32, 34.

Figure 2:
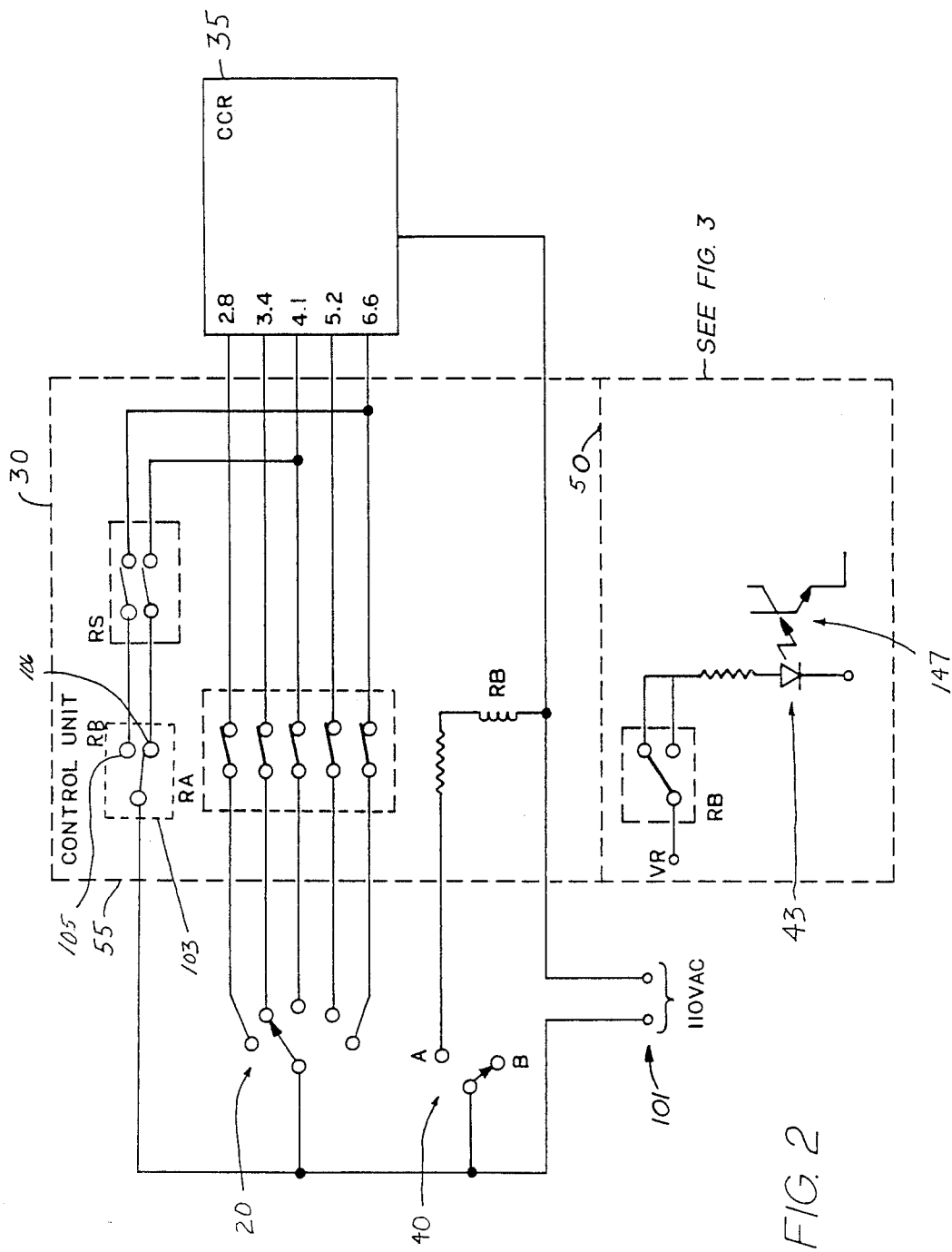
FIG. 2 is a schematic block diagram illustrating the electrical connection between a control unit, two selector switches, and a constant current regulator as shown in FIG. 1.

Referring now to FIG. 2, the control unit 30 constructed in accordance with the principles of the present invention generally includes switching circuitry 55 electrically interconnecting the selector switches 20, 40 and the constant current regulator 35, and control circuitry 50 for switching relays within the switching circuitry 55 upon receipt of a signal from the position selector switch 40.

Typically, the five-position manual intensity selector switch 20, located in the airport control tower 15, directly connects to the constant current regulator 35 and controls the amplitude of current generated by the current regulator. The intensity selector switch comprises a conventional switching arrangement and switches the voltage connects at one terminal to a 110 volt ac source or, in some cases, to a source of 48 volts dc. The constant current regulator typically generates a current at one of five pre-selected amplitudes, including 2.8, 3.4, 4.1, 5.2 and 6.6 amperes RMS.

According to the preferred embodiment of FIG. 2, the switching circuitry 55 includes relay contacts RA, RB and RS and relay coil RB, interconnecting the selector switches 20, 40 to the current regulator 35. Contact RA preferably comprises a normally-closed five switch relay for connecting the output from the intensity selector switch 20 to the current regulator 35. One relay contact connects each output from the intensity selector switch 25 to the constant current regulator 35. An associated relay coil RA forms part of the control circuitry 50 and will be discussed in detail, infra with regard to FIG. 3. Energizing coil RA opens the normally-closed relay contacts RA, thereby disconnecting the intensity selector switch 20 from the current regulator 35. Relay RA preferably comprises a R10-6PDT Relay made by Potter & Brumfield.

Relay coil RB preferably connects electrically to the position selector switch 40 to detect a change of position of switch 40. Position selector switch 40 comprises a two-position control switch changeable between position "A" and position "B" to designate whether the "A" lamps (32) or the "B" lamps (34) are to be illuminated. The input terminal of the position selector switch 40 electrically switches the 110 volt ac signal source 101 and the "A" output electrically connects to the relay coil RB. When position "A" is selected by the position selector switch 40, the relay coil RB is energized. Conversely, when position "B" is selected, coil RB is de-energized.

The contacts associated with relay coil RB preferably include a change-over relay contact 103 interconnecting the 110 voltage source 101 to two input lines of the current regulator 35. The change-over relay contact 103 includes two poles 105, 106. Pole 105 preferably connects the voltage source 101 to the 6.6 ampere input of the current regulator 35, while pole 106 connects the voltage source 101 to the 4.1 ampere input of the current regulator 35.

When the position selector switch 40 switches from contact "B" to contact "A," relay coil RB becomes energized, switching the relay contact 103 of relay RB to pole 105. In this manner, the 4.1 ampere input to the current regulator 35 connects to the voltage source 101.

Conversely, changing the position selector switch from "A" to "B" deenergizes the relay coil RB, switching relay contact 103 to pole 106. Consequently, the 6.6 ampere input to the current regulator connects to the voltage source 101. Relay RB also preferably includes a change-over relay contact 107 which provides the input to the control circuitry 50 of the control unit 30. The two poles of relay contact 107 are shorted to the input of the control circuitry 50. When relay contact 107 changes position in response to coil RB, contact 107 opens for about 2 milliseconds to trigger the control circuitry 50.

Relay RS preferably provides a second relay switch interconnecting the voltage source 101 to the 4.1 ampere and 6.6 ampere inputs of the current regulator 35. Relay RS is a two contact, normally-open relay. As will be discussed more fully with regard to FIG. 3, energizing relay coil RS closes relay contacts RS, connecting the voltage source to the 4.1 and 6.6 ampere inputs of the current regulator 35. Relay RS preferably comprises a R10-2PDT relay made by Potter & Brumfield.

Figure 3:
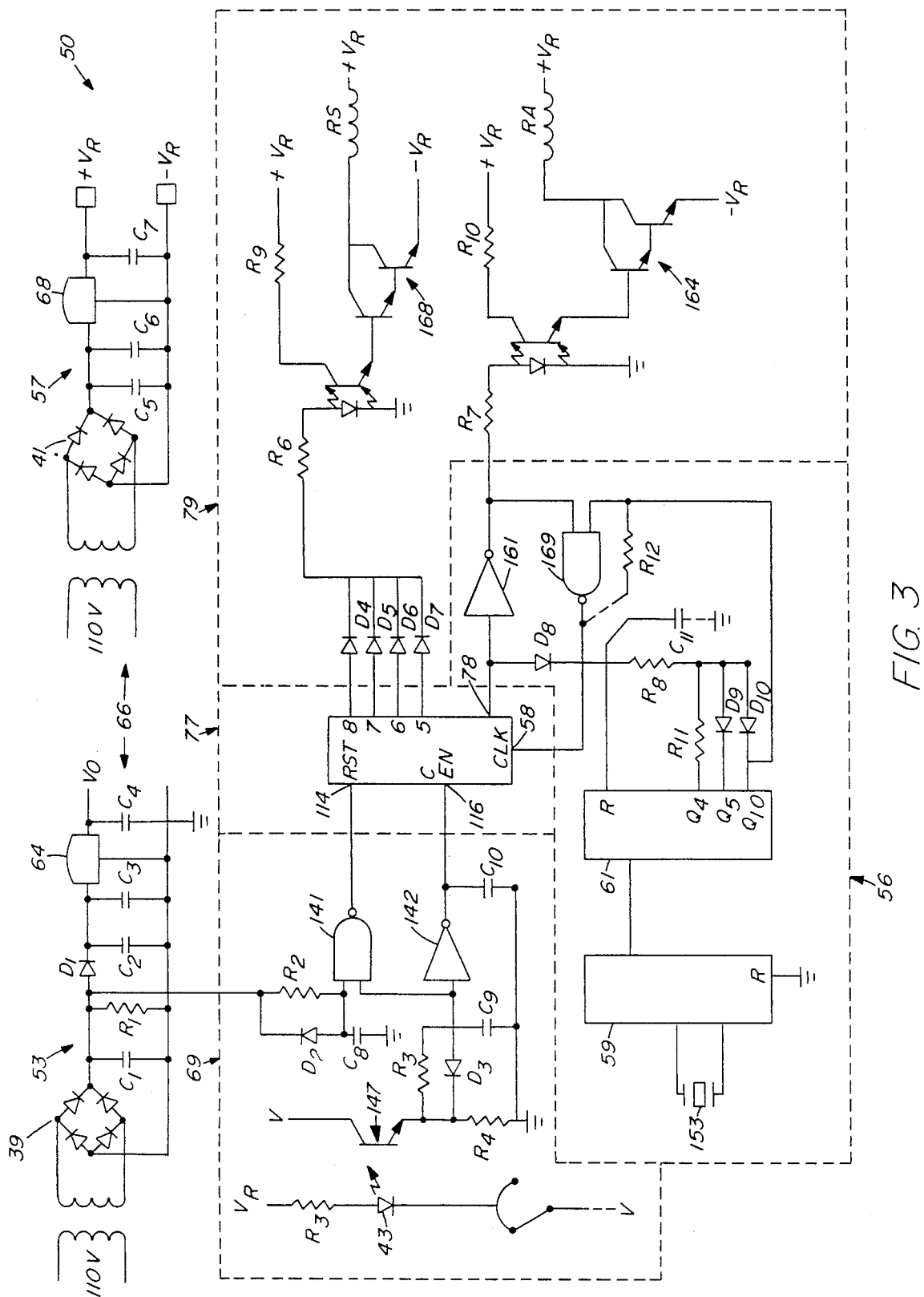
FIG. 3 is a schematic diagram of the electronics comprising the control unit of FIG. 2.

Referring now to FIG. 3, the control circuitry 50 of the control unit 30 preferably includes a power supply 66 for supplying voltage to the components of the control circuitry 50 and to the relay coils RA and RS, a clocking circuit 56, a ring counter 77, a trigger input circuit 69, and a relay driver circuit 79 for activating relays RA and RS.

The power supply 66 preferably includes a pair of conventional power circuits 53, 57. Power circuit 53 provides operating voltage Vo to the components of the electronic sequencer and includes a full wave bridge rectifier 39, an output capacitor C4 and a voltage regulator 64. The dc operating voltage Vo develops across the output capacitor C4. In addition, the power circuit 53 includes the voltage regulator 64 to obtain a regulated voltage output.

Similarly, power circuit 57 provides a regulated voltage Vr to activate relays RA and RS. Power circuit 57 also includes a full wave bridge rectifier 41, an output capacitor C7 and a voltage regulator 68. The regulated voltage Vr develops across output capacitor C7. The voltage regulators 64, 68 preferably comprises model number 7812, manufactured by Motorola, Inc.

Referring still to FIG. 3, trigger input circuit 69 preferably includes a photo transmitter 43 to transmit a control signal from the relay contact RB to the control circuitry 50, a NAND gate 141, an inverter 142 and a photoreceiver 147. The photoreceiver 147 receives the control signal from photo transmitter 43 and provides a trigger signal at the emitter output. In turn, NAND gate 141 and inverter 142 provide an output signal to reset and enable ring counter 77. Preferably, the photo transmitter 43 and the photoreceiver 147 comprise one component, a model number 4N28-OPTOCOUPLER, manufactured by Motorola.

The ring counter 77 includes a pair of input terminals 114, 116, a clock input 58, and a plurality of output terminals providing an output during the count cycle of ring counter 77. The ring counter 77 functions according to techniques that are well known in the art. Once reset and enabled by the trigger input the ring counter 77 cycles through ten settings, from 1-10 to provide an output at the respective output terminal of the ring counter 77. The ring counter 77 includes output terminals 1-10, which emit a logic '1' when the ring counter 77 is stepped through the corresponding count. After the ring counter 77 is reset and enabled by the trigger input 69, the ring counter 77 begins counting upon receipt of a clock pulse at clock input 58. When the ring counter receives the clock pulse, the ring counter emits a logic "1" output at output terminal "1." The output at that terminal remains a logic "1" until the rising edge of the following clock pulse is received, at which time the ring counter emits a logic "1" output at output terminal "2." The ring counter continues in a similar manner until a logic "1" is transmitted at output terminal "10," designated as output 78. When output 78 becomes a logic "1," the output of inverter 161 becomes a logic "0," which is input to NAND gate 164, disabling the clock input 58 to the ring counter 77. The ring counter 77, when enabled, drives the output 78 low, to again enable the clock input 58.

The signals from output terminals "5", "6", "7", and "8" are connected to relay RS. Thus, relay RS is activated at the rising edge of the fifth clock pulse and remains activated while ring counter 77 cycles from "5" to "9". The ring counter 77 includes an output 78, which transmits a logical "0" when the ring counter is counting, as described supra. Output 78 connects electrically to relay RA to activate relay RA throughout the entire cycle of ring counter 77. The ring counter preferably comprises a CD 4012, manufactured by RCA.

Clock circuit 56 includes an oscillator 153, a pair of counters 59, 61, an inverter 161 and a NAND gate 169. The clock circuit develops a 1.4 second clocking signal according to techniques that are well known in the art. When trigger input 69 activates ring counter 77, the clock circuit 56 drives the ring counter 77 through its cycle, by providing a signal at the clock input 58 of the ring counter 77 every 1.4 seconds. Clock 59 preferably comprises a model number CD 4060, manufactured by RCA; clock 61 preferably comprises model number CD 4040, also made by RCA.

The relay driver 79 receives the output from the ring counter 77 and energizing relay coils RA and RS. According to the preferred embodiment, the relay driver 79 includes a number of input diodes D4, D5, D6 and D7, a pair of cascaded switching devices 164, 168, and relay coils RA and RS. The inverter 161 of the clock circuit 56 receives a signal from output 78 of ring counter 77, to provide an output for 12.4 seconds to relay coil RA as ring counter 77 performs its cycle. A cascaded switching device 164, comprising switching transistors 152, 154, receives the output signal from inverter 161 and energizes relay coil RA. The diodes D4, D5, D6 and D7 are electrically connected to output terminals "5", "6", "7", and "8" of ring counter 77. Thus, as ring counter 77 counts through 5, 6, 7, 8, the diodes D4, D5, D6 and D7 sequentially receive an output signal to activate relay RS. A cascaded switching device 168 comprising transistors 171, 173 receives the output from diodes D4, D5, D6 and D7 and energizes relay coil RS.

Referring now to FIGS. 2 and 3, when relay coil RA becomes energized, normally-closed contacts RA are opened, disconnecting the intensity selector switch 20 from the current regulator 35. When relay coil RS is energized, normally-open contacts RS are closed, connecting the 4.1 and 6.6 ampere inputs of the current regulator 35 to the voltage source. The position selector switch 40 either energizes or de-energizes coil RB, thereby determining the input of the current regulator 35 that will be connected by relay switch RB to the voltage source 101. The constant current regulator 35 emits an electrical signal with the current determined by the signal received from control unit 30. When position selector switch 40 is changed, the current regulator 35 is turned off by the control unit 30 for approximately 5.6 seconds. The control unit 30 then enables either the 4.1 or 6.6 ampere input of the current regulator 35 for 5.6 seconds, during which the current regulator 35 emits a position select current pulse, with an amplitude of 4.1 or 6.6 amperes RMS, for 5.6 seconds.

Referring again to FIG. 1, the constant current regulator 35 electrically connects to the switching unit 25 through transmission line 19, connected at one end to the output of the constant current regulator 35 and at the other end to the ground of the regulator 35. Transmission line 19 preferably comprises the series runway conductor already in use in prior art runways. The transmission line 19 includes a plurality of current transformers 33 for coupling to a plurality of switching units 25. Preferably one transformer 33 is associated with each switching unit 25. In the preferred embodiment, a Crouse-Hinds 33004 transformer is used as current transformer 33.

Figure 4:
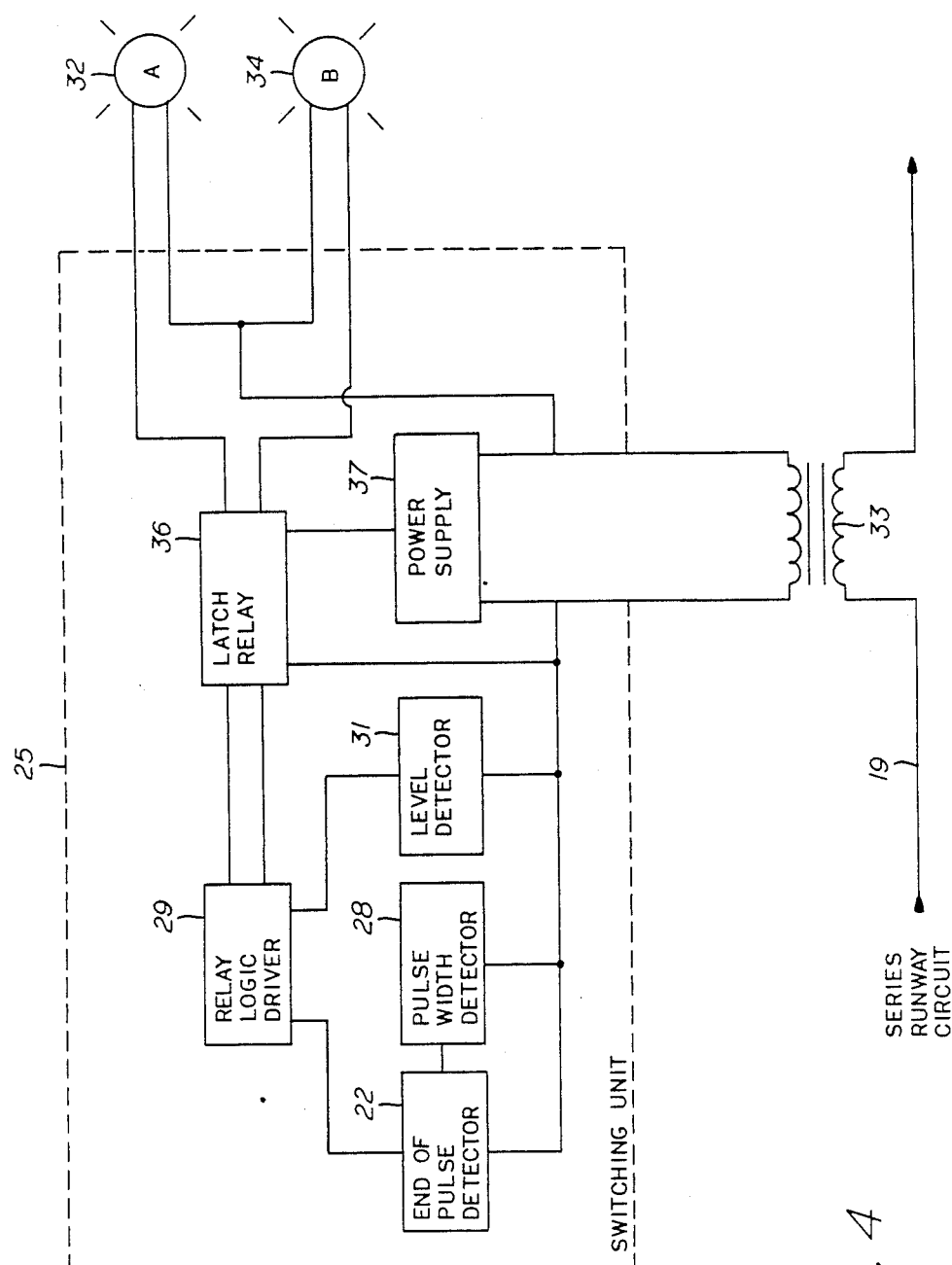
FIG. 4 is a block diagram of a switching unit used in the improved runway lighting system of FIG. 1.
Figure 5:
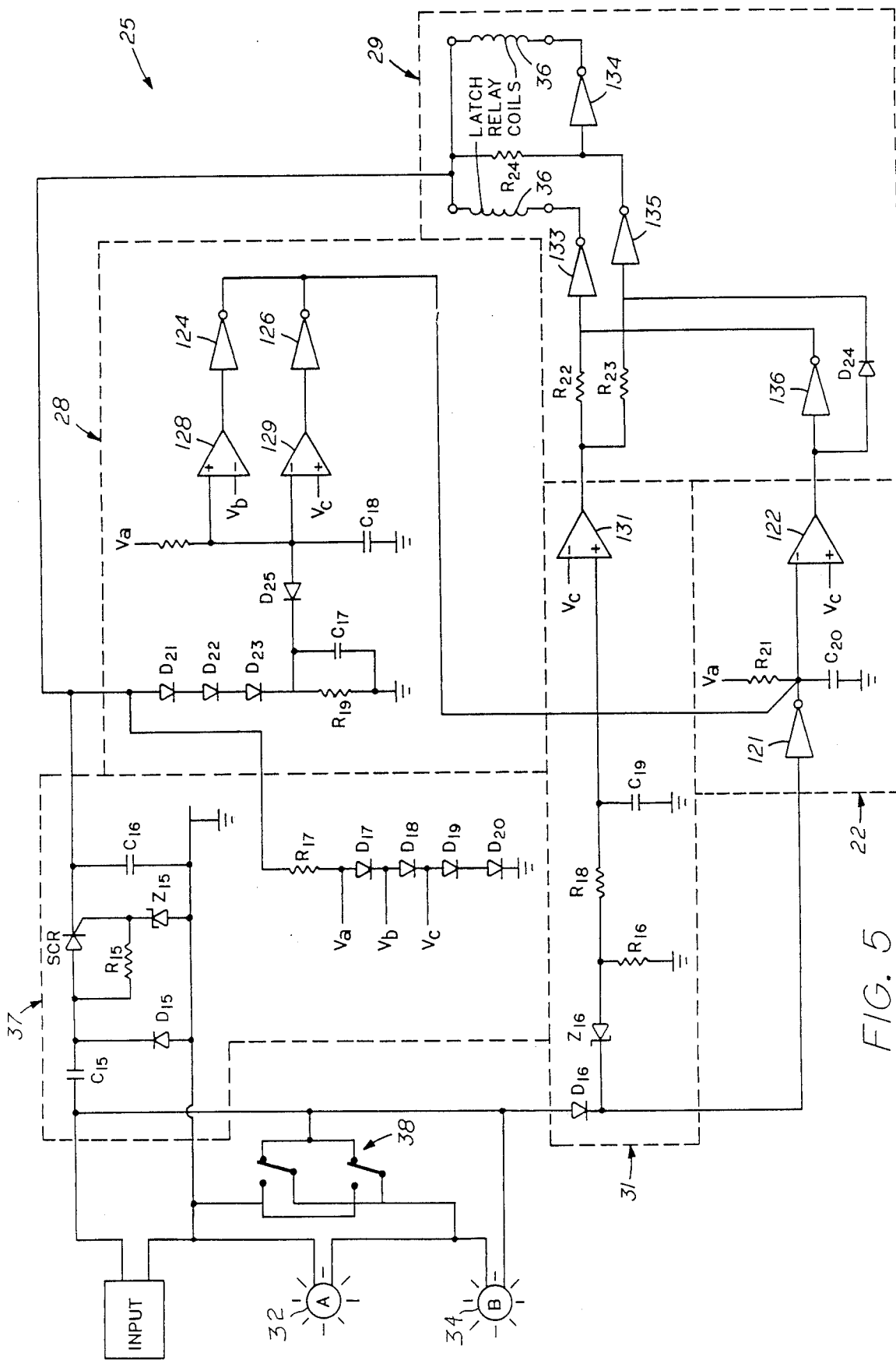
FIG. 5 is a schematic diagram of the electronics comprising the switching unit shown in FIG. 4.

Referring now to FIGS. 4 and 5, a switching unit 25 constructed in accordance with the present invention will now be described. Although only one switching unit 25 is discussed, a plurality of switching units preferably are provided to sufficiently guide aircraft to the runway. Referring to FIG. 2, the switching unit 25 preferably includes a power supply 37 for providing the switching unit 25 with dc operating voltage, a pulse width detector 28 for resetting the switching unit 25 when a pulse of an appropriate length is received from the control unit 30, a pulse level detector 31 for determining which set of lamps 32, 34 to illuminate, an end of pulse detector 22, a relay logic driver 29, and a latch relay 36, connected to lamps 32, 34.

The power supply 37 electrically connects to the output terminals of current transformer 33 and receives electrical power therefrom. As is well known in the art, power supply 27 converts the ac voltage received from transformer 33 to dc voltage, which is supplied as operating voltage to all components in the switching unit 25.

Referring now to FIG. 5, the switching unit 25 is shown schematically. The switching unit 25 receives input power from current transformer 33 at the INPUT. The power supply 37 constructed in accordance with the preferred embodiment cOmprises resistors R15, R17, capacitors C15, C16, diodes D15, D17, D18, D19, D20, zener diode Z15 and a switching element SCR. The capacitors C15, C16, resistor R15, diode D15, zener diode Z15 and SCR function as a semi-regulated voltage multiplier to multiply the input voltage from transformer 33 when the input voltage is below a predetermined minimum. The operating voltage, Vcc, develops across capacitor C16 and activates the elements in the switching unit 25. In addition, power supply 37 provides reference voltages Va, Vb, and Vc across diodes D17, D18, D19 and D20.

Referring again to FIGS. 4 and 5, the level detector 31 couples electrically to one terminal of current transformer 33 for receiving control signals from the control unit 30, as those signals are transmitted on transmission line 19. The level detector 31 recognizes two RMS amplitude levels at 4.1 ($\pm$5%) Amps RMS and 6.6 ($\pm$5%) Amps RMS and, based upon the amplitude level of the current pulse, determines which set of lamps to illuminate. These levels correspond to the amplitude levels of the position select current pulse, generated by the constant current regulator 35, as described supra. The level detector 31 outputs a characteristic signal to the relay logic driver 29, dependent on the amplitude level of the position select current pulse received.

Referring now to FIG. 5, the level detector 31 constructed in accordance with the preferred embodiment comprises resistors R16, R18, capacitor C19, diode D16, zener diode Z16 and operation amplifier 131. The output of op amp 131 is the output of the level detector 31. The inputs to the operation amplifier 131 comprise reference voltage Vc and the input signal from transformer 33. An output of "0" from operation amplifier 131 signifies that lamps 32 are to be illuminated, while an output of "1" signifies that lamps 34 are to be illuminated.

Referring again to FIGS. 4 and 5, the pulse width detector 28 also connects electrically to one terminal of current transformer 33 for receiving control signals from the control unit 30. The pulse width detector 28 detects the width of the position select current pulse emitted by the control unit 30. In the preferred embodiment, the duration of the position select current pulse is chosen as 5.6 seconds. If the pulse width detector 28 determines that the duration of the pulse is acceptable, the detector 28 generates an enable signal that is transmitted to the end of pulse detector 22. Conversely, if the pulse width detector 28 determines that the pulse is too long or too short, the detector 28 disables end of pulse detector 22.

Referring now to FIG. 5, the pulse width detector 28 preferably comprises resistors R19, R20, capacitors C17, C18, diodes D21, D22, D23, D25, operation amplifiers 128, 129, and drivers 124, 126. As the position select current pulse is received at the pulse width detector 28, the voltage across C18 begins to increase. The voltage across C18 is compared with reference voltage Vb at operation amplifier 128 and with reference voltage Vc at operation amplifier 129. If the voltage across C18 is less than the reference voltage Vb, the pulse width detector 28 emits an enabled signal. Similarly, if the voltage across C18 is greater than the reference voltage Vc, the pulse width detector 28 emits an enable signal. Resistor R19, capacitor C17 and diodes D21, D22, D23, and D25 reset the operation of the pulse width detector 22 by causing capacitor C18 to discharge.

Referring again to FIGS. 4 and 5, end of pulse detector 22 electrically couples to one terminal of current transformer 33 for receiving signals from the control unit 30. The end of pulse detector 22 also receives an enable or disable signal from the pulse width detector 22. The end of pulse detector 22 detects the end of the control pulse and generates an enable signal to the relay logic driver 29, according to techniques that are well known in the art.

Referring now to FIG. 5, the end of pulse detector 22 preferably comprises resistor R21, capacitor C20, operation amplifier 122 and driver 121. When the switching unit 25 receives input power, the output of the operation amplifier 122 is a logical "1". At the end of a pulse, the output of operation amplifier 122 becomes "0", enabling the relay logic driver 29.

Referring again to FIGS. 4 and 5, relay logic driver 29 receives signals from level detector 31 and end of pulse detector 22. The relay logic driver 29 becomes enabled upon receipt of an enabling signal from the end of pulse detector 22, and generates a signal dependent on the signal received from level detector 31. The output of the relay logic driver 29 is input into the latch relay coils 36. The latch relay contact 38 also electrically connects to one output terminal of current transformer 33. The latch relay contact 38 has two output lines, one of which connects to lamp 32, while the other connects to lamp 34. Depending on the signal received from the from relay logic driver 29, either lamp 32 or lamp 34 is switched on.

Referring now to FIG. 5, the relay logic driver 29 constructed in accordance with the preferred embodiment comprises resistors R22, R23 and R24, and drivers 133, 134, 135 and 136. The disable input to the relay logic driver 29 is the output of operation amplifier 122. The select input to the relay logic driver 29 is the output of operation amplifier 131. Thus, the relay logic driver 29 performs as follows:

| SELECT (OUTPUT FROM OP AMP 131) | DISABLE (OUTPUT FROM OP AMP 122) | POSITION |
|---|---|---|
| 1 | 1 | No Change |
| 0 | 1 | No Change |
| 0 | 0 | Position A |
| 1 | 0 | Position B |

Lamps 32, 34 are also connected to the output of current transformer for receiving ac power to drive the lamps.

The operation of the dual circuit selector switch now will be discussed by reference to the drawings. Referring to FIG. 1, the operator in the airport control tower 15 selects the lamps 32, 34 that are to be illuminated by activating the position selector switch 40. The control unit 30 receives the signal from the position selector switch 40 and turns off the constant current regulator 35 for 5.6 seconds. The control unit 30 then activates the current regulator 35 to emit the select current pulse for a duration of 5.6 seconds. The control unit 30 also controls the amplitude of the select current pulse transmitted by the current regulator 42. If lamps 32 are to be illuminated, current regulator 42 transmits a select current pulse of 4.1 amperes RMS. Conversely, if lamps 34 are to be illuminated, current regulator transmits a select current pulse of 6.6 amperes RMS.

Referring to FIGS. 4 and 5, the level detector 31 and the pulse width detector 28 receive the select current pulse. The pulse width detector 28 enables the end of pulse detector 22 if the select current pulse is approximately 5.6 seconds. If, however, the pulse is longer than 7 seconds or shorter than approximately 5.6 seconds, the pulse width detector 28 disables the end of pulse detector 22. End of pulse detector 22 enables the relay logic driver 29 when the end of the current pulse is detected.

The level detector 31 detects the amplitude of the current pulse and thereby determines which lamp 32, 34 to illuminate. If the current pulse has an amplitude level of 4.1 ($\pm 5\%$) amperes RMS, detector 31 transmits a signal to relay logic driver 29 to illuminate lamp A (32). Conversely, detection on an amplitude of 6.6 ($\pm 5\%$) amperes RMS causes detector 31 to transmit a signal to driver 29 to illuminate lamp B (34).

After receiving the enable signals from end of pulse detector 22 and the signal from level detector 31, relay logic driver 29 provides an output dependent upon whether the output from level detector 31 indicates that lamp 32 or lamp 34 should be illuminated. The output signal is transmitted to the latch relay contact 38, through coils 36, and turns on either lamp 32 or lamp 34.

According to the preferred embodiment, the following components may be used:

| NO. | DESCRIPTION | | MANUFACTURER |
|---|---|---|---|
| C1 | 10 microfarad | 35 volt | PHILIPS |
| C2 | 0.1 microfarad | 50 volt | PHILIPS |
| C3 | 100 microfarad | 25 volt | PHILIPS |
| C4 | 0.1 microfarad | 50 volt | PHILIPS |
| C5 | 0.1 microfarad | 50 volt | PHILIPS |
| C6 | 1000 microfarad | 25 volt | PHILIPS |
| C7 | 0.1 microfarad | 50 volt | PHILIPS |
| C8 | 0.68 microfarad | 25 volt | PHILIPS |
| C9 | 0.1 microfarad | 50 volt | PHILIPS |
| C10 | 0.1 microfarad | 50 volt | PHILIPS |
| C11 | 1000 picofarad | | |
| C15 | 47 microfarad | 63 volt | PHILIPS |
| C16 | 470 microfarad | 25 volt | PHILIPS |
| C17 | 10 microfarad | 35 volt | PHILIPS |
| C18 | 10 microfarad | 35 volt | PHILIPS |
| C19 | 10 microfarad | 35 volt | PHILIPS |
| C20 | 1 microfarad | 35 volt | PHILIPS |
| R1 | 3,300 ohms | ¼ watt | PHILIPS |
| R2 | 390,000 ohms | ¼ watt | PHILIPS |
| R3 | 390,000 ohms | ¼ watt | PHILIPS |
| R4 | 10,000 ohms | ¼ watt | PHILIPS |
| R5 | 1,000 ohms | 1 watt | PHILIPS |
| R6 | 3,300 ohms | ¼ watt | PHILIPS |
| R7 | 3,300 ohms | ¼ watt | PHILIPS |
| R8 | 20,000 ohms | ¼ watt | PHILIPS |
| R9 | 10,000 ohms | ¼ watt | PHILIPS |
| R10 | 10,000 ohms | ¼ watt | PHILIPS |
| R11 | 20,000 ohms | ¼ watt | PHILIPS |
| R15 | 2,400 ohms | ¼ watt | PHILIPS |
| R16 | 2,400 ohms | ¼ watt | PHILIPS |
| R17 | 5,100 ohms | ¼ watt | PHILIPS |
| R18 | 100,000 ohms | ¼ watt | PHILIPS |
| R19 | 68,000 ohms | ¼ watt | PHILIPS |
| R20 | 510,000 ohms | ¼ watt | PHILIPS |
| R21 | 100,000 ohms | ¼ watt | PHILIPS |
| R22 | 10,000 ohms | ¼ watt | PHILIPS |
| R23 | 10,000 ohms | ¼ watt | PHILIPS |
| R24 | 10,000 ohms | ¼ watt | PHILIPS |
| Z15 | 1N4720 | | MOTOROLA |
| Z16 | 1N4720 | | MOTOROLA |
| SCR | 2N5062 | | MOTOROLA |
| OP AMPS | LM324N | | MOTOROLA |
| DRIVERS | ULN2004AN | | MOTOROLA |
| ALL DIODES ARE IN4148, EXCEPT | | | MOTOROLA |
| D15 | 1N4002 | | MOTOROLA |
| D16 | 1N4002 | | MOTOROLA |
| BRIDGE RECTIFIERS ARE 1 amp 400 volts | | | |
| INVERTERS (142.161) CD 4093 | | | RCA |
| LATCH RELAY | DS2-ML2E-5VDC | | SDS RELAYS |

While a preferred embodiment of the invention has been shown and described, modifications can be made by one skilled in the art without departing in substance from the spirit of the invention. For example, as one skilled in the art will realize, various encoding patterns may be used to determine the selected direction of approach without departing from the spirit of this invention.

What is claimed is:

1. An improved runway lighting system, comprising:
    a first set of lamps for providing illumination in a first direction along the runway;
    a second set of lamps for providing illumination in a second direction along the runway;
    a plurality of fixtures for receiving lamps, wherein one lamp from said first set of lamps and one lamp from said second set of lamps are housed in a single fixture;
    means for switching on either said first set of lamps or said second set of lamps as determined by the direction of landing of incoming aircraft or of departing aircraft;
    means for controlling said switching means;
    a transmission wire electrically connecting said switching means to said controlling means, wherein said controlling means transmits a control pulse to said switching means over the transmission wire.

2. A system according to claim 1, further comprising a plurality of switching means wherein each of said switching means electrically connects to one lamp from said first set of lamps and one lamp from said second set of lamps.

3. A system according to claim 2, wherein the improved runway lighting system is installed on a runway that includes an existing lighting system powered by a series runway circuit and the series runway circuit functions as the transmission wire.

4. A system according to claim 3, further comprising;
    a selector switch electrically connected to said means for controlling for selecting which set of lamps is to be illuminated.

5. A system according to claim 4, wherein said means for controlling controls the operation of a current regulator whereby the current regulator emits a control pulse.

6. A system according to claim 3, wherein each of said switching means includes means for detecting the amplitude of the control pulse for determining which set of lamps to illuminate.

7. A system according to claim 6 wherein said switching means also includes means for detecting the width of the control pulse to enable said switching means only when a predetermined pulse is received.

8. A system according to claim 1, further comprising,
    a constant current regulator for supplying a select current pulse to said switching means for indicating which set of lamps are to be illuminated;
    a means for controlling to provide a control signal to said constant current regulator, whereby the control signal determines the amplitude of the select current pulse; and
    a position selector, connected to said means for controlling, to permit selection of either said first set of lamps or said second set of lamps for illumination.

9. A system according to claim 8, wherein the constant current regulator receives a signal from an intensity control switch in an existing control tower and provides a current output with an amplitude that varies depending upon the signal received from the intensity control switch.

10. A system according to claim 9, wherein the means for controlling turns off the constant current regulator when said means for controlling receives an output from said position selector.

11. An improved runway lighting system for an airport runway, comprising:
    a plurality of lighting fixtures, each lighting fixture including means for providing illumination in at least two directions, wherein each direction of illumination corresponds to an approach to the runway;
    means for regulating electrical energy;
    means for communicating electrical energy from the regulating means to each lighting fixture;
    means for selecting the direction of illumination of said illumination means as determined by the direction of landing of incoming aircraft or of departing aircraft;
    means responsive to said selecting means for encoding the selected direction in the electrical energy communicated from said regulating means to said lighting fixtures; and
    means at each said lighting fixture for decoding the electrical energy and illuminating said illumination means in the direction selected.

12. A system according to claim 11, wherein said illumination means includes at least two lamps, with each lamp providing illumination in a direction corresponding to an approach to the runway.

13. A system according to claim 12, wherein said regulating means comprises a current regulator.

14. A system according to claim 13, wherein said communicating means comprises existing runway circuit lines.

15. A system according to claim 13, wherein said encoding means comprises a control unit for selecting a particular input to the current regulator.

16. A system according to claim 15, wherein said selecting means includes a position selector switch for selecting which set of lamps are to be illuminated and an intensity selector switch for regulating the intensity of illumination.

17. A system according to claim 16, wherein said control unit disconnects the intensity selector switch from the current regulator for a predetermined period when the position selector switch is changed.

18. A system according to claim 13, wherein said decoding means includes means for determining the amplitude level of the electrical energy.

19. A system according to claim 13, wherein said current regulator forms part of existing runway circuitry.

20. An improved runway lighting system for installation on an existing runway lighting system, wherein the existing runway lighting system includes a plurality of runway lamps connected by a series runway transmission line, an intensity selector switch for controlling the intensity of the runway lamps, and a regulator for receiving a signal from the intensity selective switch and providing a variable output to the runway lamps, said variable output being transmitted on the series runway transmission line, comprising:
    a first set of lamps for providing illumination in a first direction along the runway;
    a second set of lamps for providing illumination in a second direction along the runway; a plurality of fixtures for receiving lamps, wherein one lamp from said first set of lamps and one lamp from said second set of lamps are housed in a single fixture;

means for switching on either said first set of lamps or said second set of lamps as determined by the direction of landing of incoming aircraft or of departing aircraft, said means for switching being connected electrically to said series runway transmission line and receiving the variable output from said regulator; and means for controlling said switching means, said means for controlling electrically connected to said regulator for controlling the output of said regulator.

* * * * *

UNITED STATES PATENT AND TRADEMARK OFFICE
CERTIFICATE OF CORRECTION

PATENT NO. : 4,951,046

DATED : August 21, 1990

INVENTOR(S) : Robert E. Lambert and Simcha Ohrenstein

It is certified that error appears in the above—identified patent and that said Letters Patent is hereby corrected as shown below:

Column 7, line 61; in the word "comprises" delete "O" insert --o--.

Column 10, line 61; after 142 delete "." insert --,--.

Column 10, line 63; delete "RELAY".

Column 11, line 46; delete "determing" insert --determining--.

Signed and Sealed this

Twenty-eighth Day of January, 1992

Attest:

HARRY F. MANBECK, JR.

Attesting Officer

Commissioner of Patents and Trademarks